(No Model.) 2 Sheets—Sheet 1.
A. KOTIN.
GEAR WHEEL AND DRIVING CHAIN.
No. 579,237. Patented Mar. 23, 1897.
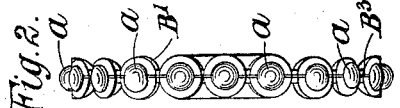
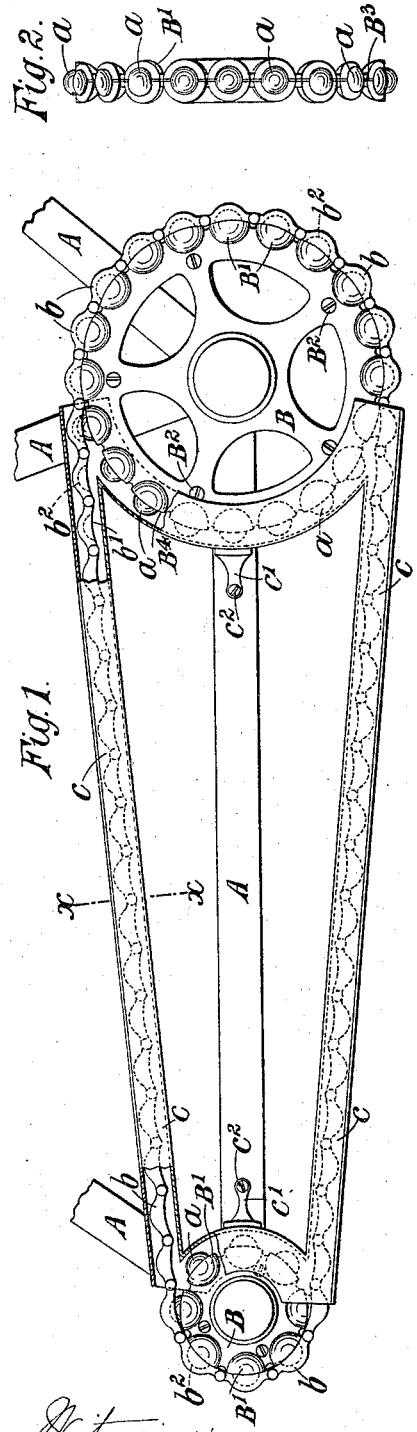
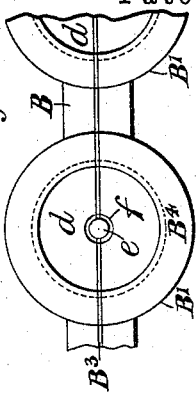
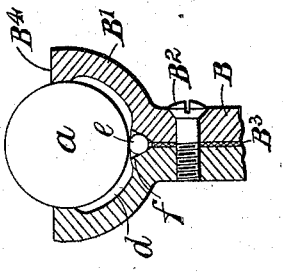
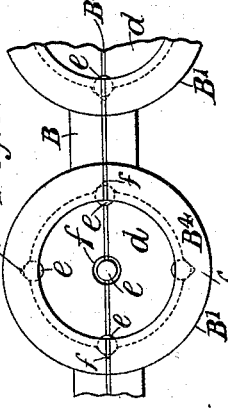
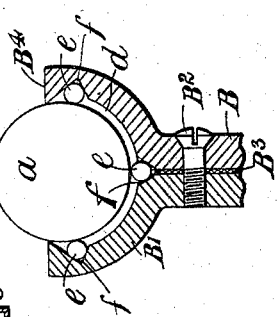
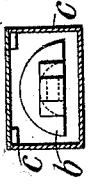
Witnesses:
B. W. Miller.
E. A. Balloch.
Inventor
Adolph Kotin.
By his Attorneys
Baldwin, Davidson & Wight.
THE NORRIS PETERS CO., PHOTO-LITHO., WASHINGTON, D. C.

(No Model.) 2 Sheets—Sheet 2.
A. KOTIN.
GEAR WHEEL AND DRIVING CHAIN.
No. 579,237. Patented Mar. 23, 1897.
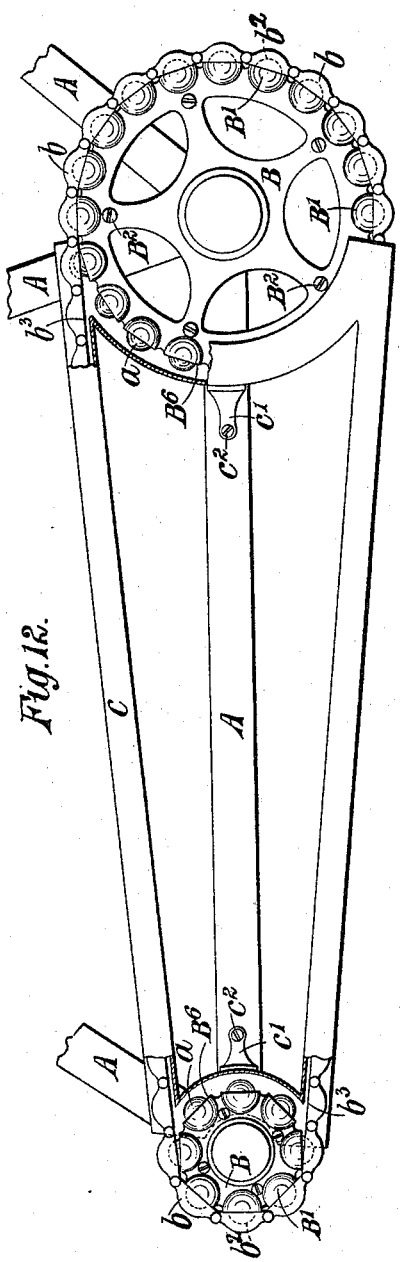
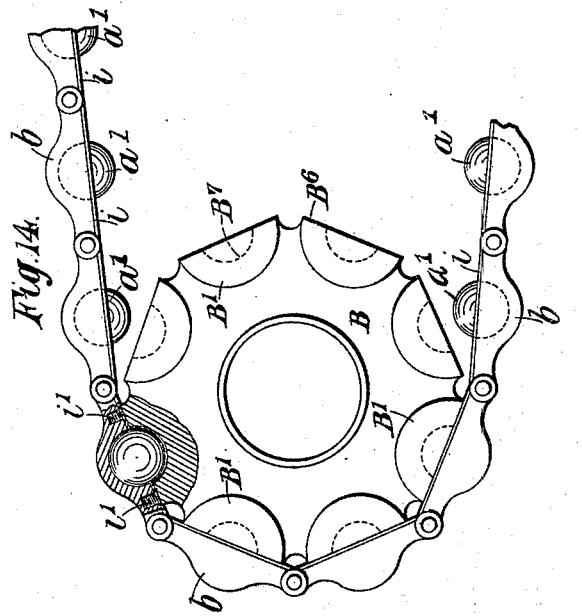
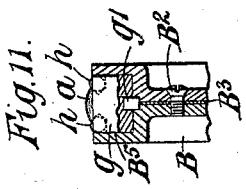
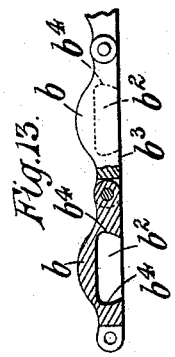
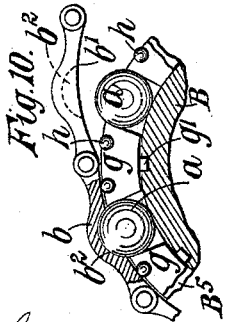
Witnesses:
D. W. Miller
E. H. Palloch
Inventor:
Adolph Kotin,
By his Attorneys,
Baldwin, Davidson & Wight

UNITED STATES PATENT OFFICE.

ADOLPH KOTIN, OF LONDON, ENGLAND.

GEAR-WHEEL AND DRIVING-CHAIN.

SPECIFICATION forming part of Letters Patent No. 579,237, dated March 23, 1897.

Application filed April 10, 1896. Serial No. 586,983. (No model.)

*To all whom it may concern:*

Be it known that I, ADOLPH KOTIN, a subject of the Czar of Russia, residing at 24 Clifton Road, Maida Vale, London, in the county of Middlesex and Kingdom of England, have invented certain new and useful Improvements in and Relating to Gear-Wheels and Driving-Chains, of which the following is a specification.

My invention relates to driving chains and wheels more especially designed for use on velocipedes or the like, but which are also applicable for other driving purposes; and my said invention comprises the improvements hereinafter set forth.

In the drawings, Figure 1 is a side elevation showing one form or modification of my improved gear-wheels and driving-chain. Fig. 2 is an end view of one of the gear or chain wheels thereof. Fig. 3 is a transverse section on the line $xx$, Fig. 1, drawn to an enlarged scale, showing a detail of construction hereinafter described. Fig. 4 is a plan, and Fig. 5 is an under side view, drawn to the same scale as Fig. 3, showing a portion of my improved chain. Fig. 6 is a plan, Fig. 7 is a transverse section, and Figs. 8 and 9 are similar views, all drawn to a still further enlarged scale, showing two methods of supporting or mounting the balls or spheres in the rim of the wheel. Figs. 10 and 11 are respectively a longitudinal and a transverse section of a portion of a chain-wheel, showing another slight modification hereinafter described. Fig. 12 is a similar view to Fig. 1, illustrating a further modification of gear or chain wheels and chain. Fig. 13 is a side elevation, partly in section, drawn to the same scale as Figs. 10 and 11, showing a slight modification of the said chain; and Fig. 14 is a side elevation, partly in vertical longitudinal section, also drawn to the same scale as Figs. 10 and 11 and illustrating a still further modification, wherein the balls or spheres are mounted in the chain instead of in the wheel or wheels, as before.

Like letters of reference indicate corresponding parts throughout the drawings.

A is a portion of the frame of a velocipede. B B are the gear or chain wheels of the driving mechanism.

In the form illustrated in Figs. 1 and 2 I construct the gear or chain wheels B in two parts or halves divided vertically, and I mount suitable hardened steel or other balls or spheres $a$ in cups, sockets, or recesses formed in the enlargements B' on the rims thereof, one-half of each cup, socket, or recess being situated in the one part or portion of the wheel and the other half in the other part or portion thereof. The two halves of each of the wheels B may be secured together by screws B² or otherwise, and for the purpose of adjustment to allow for wear I prefer to interpose a washer B³. The balls or spheres $a$ are inclosed in the sockets to a point slightly above the center or half the diameter thereof, and are thus, while capable of revolving freely in every direction, prevented from quitting the said sockets.

To enable the chain gearing with the ball-toothed wheels B to more readily adapt itself to its curvature as it passes around the chain-wheels, I provide upon each of the links $b$ thereof a surface $b'$, that forms an arc of the circle of the chain-wheel or of one of the chain-wheels. When the chain-wheels are of different dimensions, as shown in the drawings, the surfaces $b'$ are made to correspond with the circumference of one of the wheels, (the smaller one in this instance,) and on the other chain-wheel I form undulations or arcs B⁴, each of which is struck with the same radius as that of the smaller wheel.

$b^2$ is a recess formed in each of the links $b$ for engaging with or upon the projecting portions of the balls or spheres $a$. By forming the links solid, as shown clearly in Fig. 4, the ingress of dust and the like from the outer side thereof is prevented.

$c$ is a metal or other tube or guard which may be used for protecting those portions of the chain not actually in contact with the gear or chain wheels from dust or dirt. The guard $c$ may be of rectangular form in transverse section, as shown in Fig. 3, or of other suitable shape, and is secured to the frame A by lugs $c'$ and screws $c^2$ or in any other convenient manner.

In the modification shown in Figs. 6 and 7 and Figs. 8 and 9 the recesses or sockets in the chain-wheels for receiving the balls or spheres are enlarged below the point of contact with the latter, as indicated at $d$, and the said balls or spheres are carried upon smaller balls or spheres $e$, placed in conical or other recesses $f$ in the enlarged portions $d$ of the main recesses or sockets. In the plan views, Figs. 6 and 8, the main or large balls or spheres $a$ are removed. The transverse sections, Figs. 7 and 9, show the method of supporting the latter upon the small or supplementary balls or spheres. Five supplementary balls are used in each main recess or socket in the form shown in Figs. 6 and 7, and one in each main recess or socket in that shown in Figs. 8 and 9; but it is obvious that any other convenient number of the said supplementary balls or spheres might be employed.

In the form or modification illustrated in Figs. 10 and 11 the main balls or spheres are carried in a circumferential groove $B^5$, formed between the two halves of the chain-wheel B, the upper inner edges of the said groove being preferably formed slightly overhanging, so as to retain the said balls or spheres in position therein.

$g\ g$ are distance pieces or blocks for retaining the said main balls or spheres at suitable regular distances apart. These distance pieces or blocks $g$ may be secured or retained in position by steady-pins $g'$ or otherwise, and are preferably somewhat undercut, as shown from their points of contact with the main balls or spheres, so as to reduce friction.

$h\ h$ are small balls let into holes drilled partially in the edges of the upper surfaces of the said distance pieces or blocks, so that the said balls project a certain distance therefrom and form bearings for the curved surfaces $b'$ of the chain-links to run upon and so reduce friction.

In the form or modification shown in Fig. 12 the cups $B'$ are provided with flat surfaces $B^6$ and the links $b$ with corresponding flat surfaces $b^3$. The guard $c$ is in this instance formed trough-shaped or so as to inclose the chain on three sides only.

In some cases I prefer to form the recesses $b^2$ in the links $b$ with enlargements $b^4$, as shown in Fig. 13, so that the outer edges of the said recesses only will come in contact with the balls or spheres. The wheels may likewise in this case be built up as shown in Figs. 10 and 11, the upper surfaces of the distance-pieces $g$ being formed flat to correspond with the flat surfaces $b^3$ on the links $b$.

In Fig. 14 the chain-wheel B is provided with open recesses $B^7$, instead of having balls or spheres mounted therein, as before, and balls or spheres $a'$ are so mounted in suitable sockets or recesses in the links $b$ of the chain as to be free to revolve therein, and that a sufficient portion thereof will project therefrom to engage in the said recesses $B^7$ in the chain-wheel. The balls or spheres $a'$ are retained in position in the sockets or recesses in the links $b$ by plates $i$, secured to the faces of the said links by means of screws $i'$ or otherwise. I sometimes, however, form the said links in two parts, one half of each of the said sockets or recesses being in the one part of each link and the remaining half in the other part, the balls or spheres being placed in position in the said sockets or recesses and retained therein in a similar manner to those in the wheels B. The two parts of each of the links will be held together by the rivets or pins through which the one link is connected to the other. At the ends of each of the said chain-links or otherwise suitably disposed thereon I may provide steel or other hooks or projections adapted to engage with suitable teeth or projections formed or provided upon the flanges of the gear or chain wheels. In some instances I find it convenient to mount the balls or spheres of either the gear-wheels or the chain upon a suitable pin or pins or otherwise, so that they are free to rotate axially thereon.

It is obvious that any two of my improved gear or chain wheels may be arranged to gear or mesh together, in which case the driving-chain is dispensed with.

What I claim as my invention, and desire to secure by Letters Patent, is—

1. The combination of two gear-wheels and a chain, ball-teeth arranged in sockets formed in the wheels and chain, and bearing-surfaces formed on the wheels about the sockets which match corresponding portions of the chain.

2. The combination of a chain, two wheels of different diameters having sockets containing ball-teeth and having bearing portions for the chain each formed to match the bearing portions of the links of the chain, substantially as described.

3. The combination of two gear-wheels and a chain, and ball-teeth completely inclosed in sockets formed in the wheels and chain where they intermesh, and smaller balls arranged in recesses within the sockets of the ball-teeth.

4. The combination of a chain, two wheels of different diameters having sockets containing ball-teeth, and having bearing portions for the chain struck from the same radius in both wheels to match corresponding bearing portions in the links of the chain.

5. A gear-wheel provided with ball-teeth and having sockets for the ball-teeth provided with recesses, in combination with antifriction-balls arranged in said recesses, substantially as described.

6. A gear-wheel having a circumferential groove and provided with spacing-blocks to form sockets in the groove, means for holding the spacing-blocks in place and ball-teeth arranged between the spacing-blocks.

7. A gear-wheel having a circumferential groove, spacing-blocks arranged in the groove, means for holding the spacing-blocks in place, ball-teeth arranged in sockets between the spacing-blocks, antifriction-balls carried by the spacing-blocks and a chain having sockets gearing with the balls.

In testimony whereof I have hereunto subscribed my name.

ADOLPH KOTIN.

Witnesses:
A. F. SPOONER,
H. WALLIS TAYLOR.